E. A. CAMPBELL.
ADVERTISING APPARATUS FOR VEHICLE TOPS.
APPLICATION FILED NOV. 8, 1915.
1,224,446.
Patented May 1, 1917.
2 SHEETS—SHEET 1.
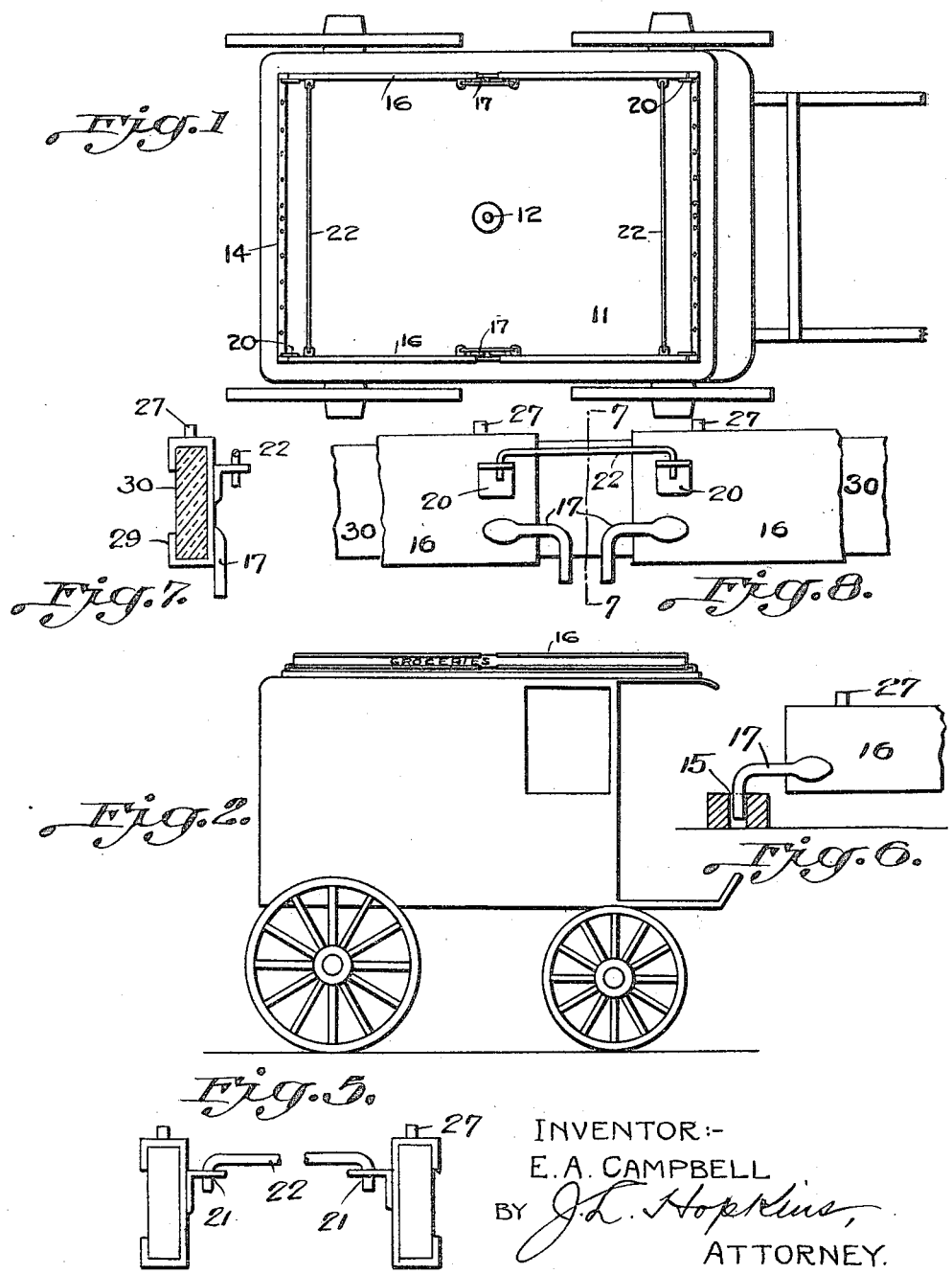
INVENTOR:-
E. A. CAMPBELL
BY J. L. Hopkins,
ATTORNEY.

E. A. CAMPBELL.
ADVERTISING APPARATUS FOR VEHICLE TOPS.
APPLICATION FILED NOV. 8, 1915.
1,224,446.
Patented May 1, 1917.
2 SHEETS—SHEET 2.
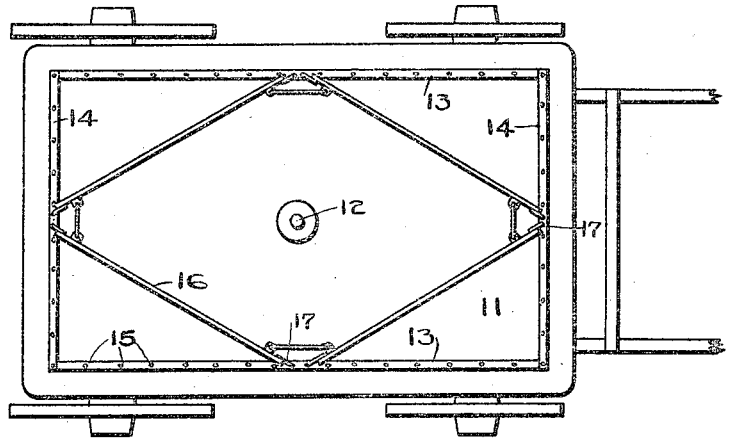
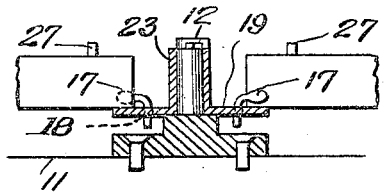
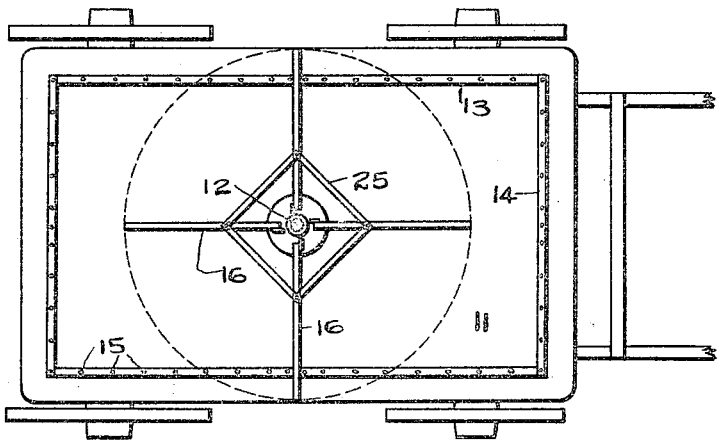
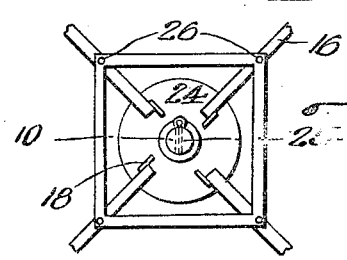
INVENTOR:—
E. A. CAMPBELL.
BY *J. L. Hopkins*,
ATTORNEY.

UNITED STATES PATENT OFFICE.

EDWARD A. CAMPBELL, OF ST. LOUIS, MISSOURI.

ADVERTISING APPARATUS FOR VEHICLE-TOPS.

1,224,446.  Specification of Letters Patent.  Patented May 1, 1917.

Application filed November 8, 1915. Serial No. 60,180.

*To all whom it may concern:*

Be it known that I, EDWARD A. CAMPBELL, a citizen of the United States, residing at the city of St. Louis, State of Missouri, have invented certain new and useful Improvements in Advertising Apparatus for Vehicle-Tops, of which the following is a specification, reference being had therein to the accompanying drawing.

My invention relates to improvements in advertising apparatus for vehicle tops, and has for its object to provide a display-sign equipment suitable for use on the tops of commercial vehicles, and capable of being disposed at various angles to the path of travel of the vehicle.

In the drawings—

Figure 1 is a top plan view of a vehicle equipped with an apparatus embodying my invention.

Fig. 2 is a side elevation of the same.

Fig. 3 is a top plan view of the same showing the display-sign member arranged in diamond shape.

Fig. 4 is a similar view showing the display-sign member radially mounted at the center of the top of the vehicle.

Fig. 5 is an enlarged detail of the link connection between the display-sign members.

Fig. 6 is an enlarged detail view of the hook with which each display-sign member is provided at its end.

Fig. 7 is a sectional view taken on the line 7—7 of Fig. 8.

Fig. 8 is a rear elevation of the meeting ends of two of the display-sign members, illustrating their connections.

Fig. 9 is a top plan view of the pintle and supporting plate used when the display-sign members are radially mounted.

Fig. 10 is a sectional view of the structure illustrated in Fig. 9, taken on the line 10—10 of Fig. 9.

As illustrated in the drawings, the vehicle top 11 is provided at or near its center with a pintle 12, and parallel with its side lines, said top 11 is provided with the side-bar members 13. which are connected at their ends by the socketed end-bar members 14; the sockets being indicated by the numeral 15. Said sockets 15 are so spaced and equidistant from each other as to permit the display-sign members 16 being mounted either in alinement with the side bars 13 or end-bars 14, or as shown in Fig. 3, with one end of the sign member 16 being mounted on one of the end bars 14, and the other end mounted on one of the side bars 13. Each of said sign members 16 is provided at its extremities with a hook 17 adapted to be seated in one of the sockets 15, or in one of the apertures 18 with which the plate 19 is provided. It is evident that the sign members 16 may be arranged with the hook at one end engaging one of the sockets 15 in the frame and the hook at the other end engaging one of the apertures 18 in the plate 19. Each of said sign members 16 is provided with a bracket 20 at each extremity, said bracket 20 being perforated as indicated by the numeral 21 to receive one end of the link 22, whose use is illustrated in Figs. 1, 3, 5, 7 and 8.

The plate 19 is provided with a collar 23 fitting about the pintle 12 and held in place thereon by means of a pin 24. When the sign-members 16 are mounted on the plate 19 as illustrated in Figs. 9 and 10 and in Fig. 4, said sign-members 16 are kept equidistant from each other, and in radial alinement with the pintle 12 by means of the frame 25, which is apertured at its corners as indicated by the numeral 26, to engage with the pins 27 with which the said sign-members 16 are provided on their upper edges.

As sign-members I have illustrated the channels 29, which receive movable block letters 30, so that the lettering of said sign in said sign-members 16 may be varied at will by the user. By the construction shown said sign-members 16 may be displayed at the front end, rear end, or sides of the vehicle, or radiating from the pintle 12 as shown in Fig. 4, or in diamond shape as illustrated in Fig. 3.

Having thus described my invention what I claim as new and desire to have secured to me by the grant of Letters Patent, is—

1. In a device of the class described a rectangular supporting frame provided with sockets on its upper edge; a pintle mounted within said frame; an apertured plate adapted to be mounted on said pintle; and a plurality of display-sign members provided with hooks to engage said sockets and the apertures in said plate.

2. In a device of the class described a rectangular frame provided with sockets on its upper edge and composed of end-bars and side-bars; a plurality of display-sign members having pins to engage said sockets; said pins and sockets being so spaced that said sign members may be mounted and held in alinement with the end-bars or side-bars of said frame, or with one end of said sign-member engaging a side-bar and the other end engaging an end-bar of said frame.

In testimony whereof I hereunto affix my signature.

EDWARD A. CAMPBELL.

Copies of this patent may be obtained for five cents each, by addressing the "Commissioner of Patents, Washington, D. C."